(12) United States Patent
Yamamoto

(10) Patent No.: US 8,125,555 B2
(45) Date of Patent: Feb. 28, 2012

(54) IMAGE DISPLAY DEVICE

(75) Inventor: Akira Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/325,980

(22) Filed: Dec. 1, 2008

(65) Prior Publication Data

US 2009/0079858 A1     Mar. 26, 2009

Related U.S. Application Data

(63) Continuation of application No. 10/945,764, filed on Sep. 21, 2004, now Pat. No. 7,499,092.

(30) Foreign Application Priority Data

Oct. 1, 2003   (JP) ................................. 2003-342959

(51) Int. Cl.
*H04N 5/222* (2006.01)
(52) U.S. Cl. ................................. 348/333.01
(58) Field of Classification Search .............. 348/333.01
See application file for complete search history.

(56) References Cited

U.S. PATENT DOCUMENTS

| | | | |
|---|---|---|---|
| 5,796,508 A | 8/1998 | Suzuki | 359/224 |
| 5,933,186 A | 8/1999 | Ikari et al. | 348/97 |
| 7,499,092 B2 * | 3/2009 | Yamamoto | 348/333.01 |
| 2002/0093477 A1 | 7/2002 | Wood | 345/89 |
| 2003/0174234 A1 | 9/2003 | Kondo et al. | 348/362 |
| 2004/0130649 A1 * | 7/2004 | Lee | 348/345 |
| 2007/0126920 A1 | 6/2007 | Lee | 348/345 |
| 2007/0176719 A1 | 8/2007 | Levitan et al. | 335/209 |

FOREIGN PATENT DOCUMENTS

| | | |
|---|---|---|
| JP | 11-84291 | 3/1999 |
| JP | 2001-235706 | 8/2001 |
| JP | 2002-300613 | 10/2002 |
| JP | 2003-021800 | 1/2003 |
| JP | 2003-029201 | 1/2003 |

* cited by examiner

*Primary Examiner* — James Hannett
(74) *Attorney, Agent, or Firm* — Canon U.S.A., Inc. IP Division

(57) ABSTRACT

Disclosed is a scanning image display device for displaying an image on a plurality of display screens. The image display device includes a light source, a scanner for two-dimensionally scanning with light from the light source, and a controller which is electrically connected with the light source and the scanner. The controller controls the light source and the scanner to form an image on the surfaces to be scanned. The scanner is configured to be capable of scanning the independent plurality of scanning surfaces with the light from the light source.

5 Claims, 12 Drawing Sheets

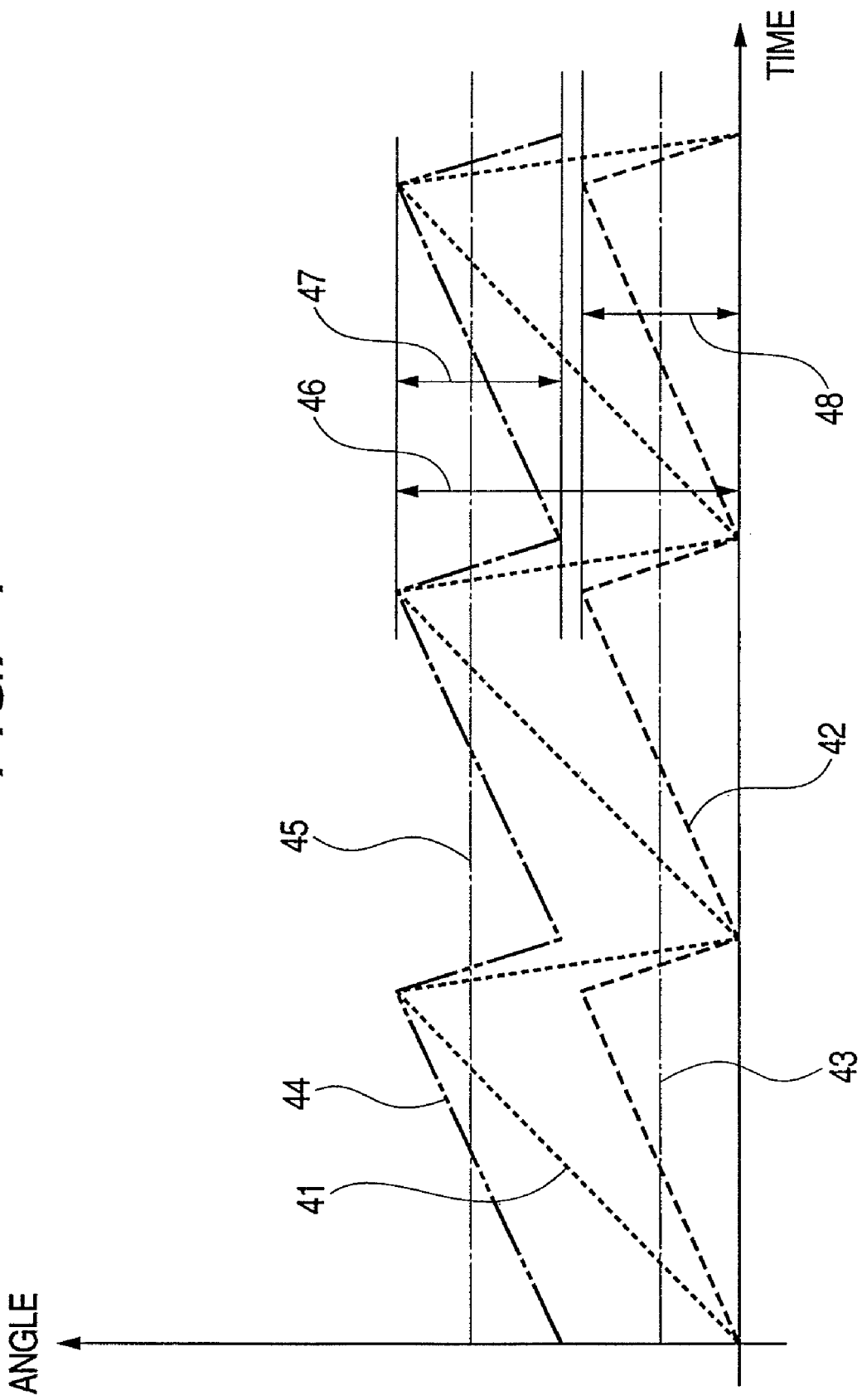

IMAGE DISPLAY DEVICE

This is a continuation of prior application Ser. No. 10/945,764, filed on Sep. 21, 2004, which is hereby incorporated by reference.

BACKGROUND OF THE INVENTION

1. Field of the Invention

The present invention relates to a scanning display device for forming an image by two-dimensional scanning with a light beam, and more particularly to a scanning display device having a plurality of scanning surfaces. In addition, the present invention relates to a video image taking apparatus such as a digital still camera or a digital video camcorder, having the scanning display device serving as an electronic viewfinder.

2. Related Background Art

An apparatus for recording an image obtained by an image pickup device represented by a charge-coupled device (CCD) includes a so-called digital stall camera (hereinafter referred to as a DSC) and a digital video camcorder (hereinafter referred to as a DVC). The DSC and the DVC each are generally provided with a finder for exhibiting an image taking area to a user.

For a large number of apparatuses, an optical view finder having a specific optical system is used as the finder in addition to an optical system for performing image pickup by a CCD or the like. However, in the case of such an optical view finder system using the optical system in addition to the optical system utilized for image pickup, there is a problem in that an image taking region observed through the finder is different from an image taking region of an image which is actually taken by a so-called parallax, in particular, in close-up image taking.

In contrast to this, there is an electronic viewfinder for displaying, as an image, a signal from the image pickup device such as the CCD on a display panel like a small size liquid crystal panel and enlarging the image for observation using an optical system. According to the electronic viewfinder, without being processed, the signal from the image pickup device is utilized. Therefore, an image having same view angle as that of the image, which is actually to be taken, can be observed, so that the image taking region can be determined with parallax error-free view.

An electronic viewfinder system using a scanning image display device as described in Japanese Patent Application Laid-Open No. H11-084291 has been proposed as an electronic viewfinder system in which a high-resolution image can be obtained. The scanning image display device is of a finder system which does not utilize a conventional display device such as a liquid crystal panel, and can obtain the high-resolution image. Because the liquid crystal panel or the like is not utilized as the display device, for example, a manufacturing problem such as the occurrence of a pixel defect is unlikely to cause.

On the other hand, for a large number of DSCs and DVCs, a direct-view display element having a size of several inches is provided on the side surface or rear surface of a main body in addition to a conventional near eye viewfinder. The direct-view display element is utilized instead of the viewfinder by displaying the signal from the image pickup device without being processed as in the electronic viewfinder. In this case, as compared with the conventional viewfinder, an effect such as an improvement of the degree of freedom of posture in image taking is obtained. The direct-view display element is also used to display an image taking condition, a battery level, the number of taken images, and the like. Therefore, an effect such as an improvement of convenience is large when the DSC or the DVC is used.

However, the direct-view display element has a defect that display is hard to be viewed in an environment of lighted surroundings such as the outdoors on a bright day. Therefore, the direct-view display element cannot always serve as the viewfinder.

Therefore, in the DSC and the DVC, in order that an image taking region is checked regardless of a state such as lighting of the surroundings and convenience that information including a current image taking condition is also displayed is ensured, it is preferable that the direct-view display element is provided on the side surface or rear surface in addition to the electronic view finder.

When the DSC or the DVC is provided with two display systems, that is, both the electronic viewfinder and the direct-view display element, it is necessary to provide at least two display devices such as liquid crystal panels. Therefore, a reduction in size and weight of an image taking apparatus becomes difficult, so that an increase in cost of the image taking apparatus occurs.

SUMMARY OF THE INVENTION

An object of the present invention is to provide a scanning image display device capable of performing display on a plurality of display screens by a single scanning display mechanism.

Another object of the present invention is to provide a video image taking apparatus which includes, for example, a near eye electronic view finder, which is to be looked through, and a direct-view display element provided on a side surface or rear surface and can utilize two display modes of the electronic view finder and the direct-view display element with a single scanning display mechanism and perform high resolution display.

To solve the above-mentioned problems, an image display device according to an example of the present invention includes: a light source; a scanner for two-dimensional scanning with light from the light source; and a controller which is electrically connected with the light source and the scanner and controls the light source and the scanner so as to form an image on the scanning surface, in which the scanner is configured to be capable of scanning plurality of scanning surfaces independent from each other with the light from the light source.

An image taking apparatus of the present invention according to an example of the present invention includes: an image taking optical system; a photoelectric transducer for receiving an image formed by the image taking optical system and converting the image into an electrical signal; and the above-mentioned image display device, in which the controller of the image display device controls the light source and the scanner based on the electrical signal from the photoelectric transducer so as to form the image on the scanning surfaces.

The image taking apparatus has an electronic viewfinder and a direct-view display element as display portions of the image display device.

BRIEF DESCRIPTION OF THE DRAWINGS

FIG. 4 is an example of an explanatory graph showing scanning amplitude of the deflection mirror device in Embodiment 1;

DETAILED DESCRIPTION OF THE PREFERRED EMBODIMENTS

Hereinafter, a scanning image display device and a video image taking apparatus according to embodiments of the present invention will be specifically described.

Embodiment 1

Figure 1:
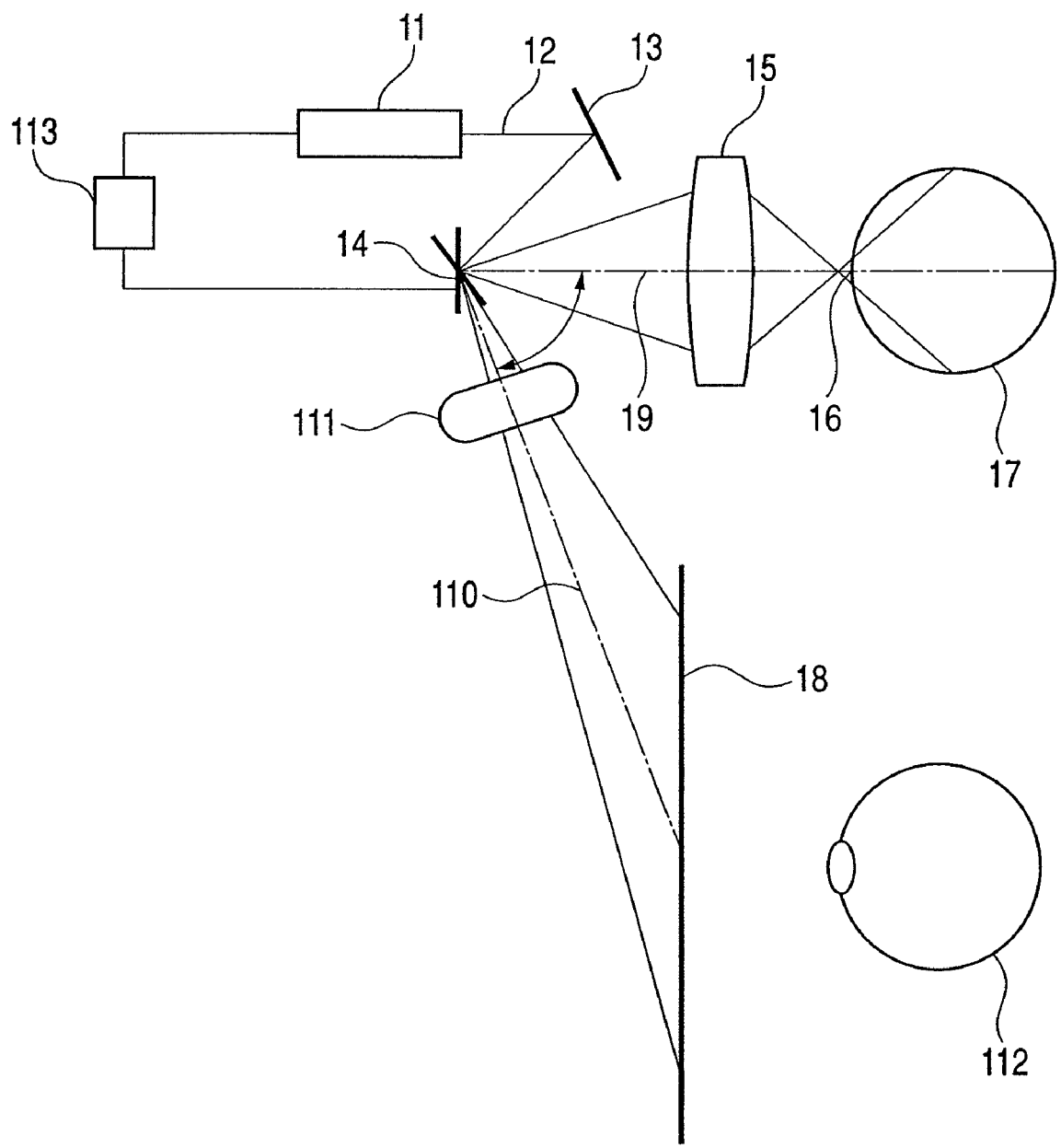
FIG. 1 is a schematic structural diagram showing a scanning image display device according to Embodiment 1 of the present invention.

Embodiment 1 of the present invention will be described with reference to FIG. 1. FIG. 1 is a schematic diagram showing a scanning image display device according to Embodiment 1. A reflection mirror 13 bends an optical path of a light beam 12 emitted from a light source 11 and the light beam 12 is incident on a reflection scanner 14. The light beam 12 incident on the reflection scanner 14 is scanned in two-dimensional directions by the scanner 14. Gradation of the light beam 12 emitted from the light source 11 and an angle of the light beam 12 with which the scanning performed by the scanner 14 are controlled by a controller 113 electrically connected with the light source 11 and the scanner 14 (which may be wired connection or wireless connection). Therefore, it is possible to draw a predetermined image. When a plurality of light sources having different wavelengths are used for the light source 11, full color image display can be achieved.

For example, a light source for generating laser light, such as a laser diode (semiconductor laser) can be used as the light source 11. When an LED or a light source for generating general scattering light is used, it is effective to provide an optical system for converting light from the LED or the light source into a sufficiently slit beam.

As described later, in FIG. 1, the scanner 14 can scan at least one of or both of an optical element composing an eyepiece optical system 15 and a back screen 18 having a diffusion plate characteristic through a predetermined optical system 111.

In the case where an object scanned with the light beam 12 by the scanner 14 is changed, when all the objects to be scanned are included in a region which can be scanned by the scanner 14, by selecting the scanning region of the scanner 14 by the controller 113, it is possible to scan a plurality of objects to be scanned.

On the other hand, when a plurality of objects to be scanned are not included in the scanning region, the scanning region may be changed by a means for changing a mounted angle of the scanner 14 as described later.

For example, when a position of the reflection mirror 13 is changed without changing the scanning angle and mounted angle of the scanner 14, the object to be scanned can be changed by changing an incident angle of the light beam 12 incident on the scanners 14.

Further, the object to be scanned can be also changeable by switching the optical path of the light flux exited from the scanner 14 to a different direction, such as by using a polarization beam splitter for transmitting or reflecting light according to a selected polarization state of the light, or by disposing a reflection mirror on an exit optical path of the light flux exited from the scanner 14 whose mounted angle is changeable.

In this embodiment, the case where a plurality of objects to be scanned are scanned by selecting the scanning region of the scanner 14 by the controller 113, in particular, when the plurality of objects to be scanned are included in the region which can be scanned by the scanner 14 will be described below.

In FIG. 1, the scanning center of the scanner 14 is located at an angle θ1 relative to the incident direction of the light beam 12 (hereinafter referred to as State 1) and is on a first optical axis 19 which is the optical axis of the eyepiece optical system 15. When the optical element composing the eyepiece optical system 15 is scanned with the light beam 12 by the scanner 14, the light beam 12 is incident on the eyepiece optical system 15. Here, the region scanned with the light beam 12 depends on the scanning angle of the scanner 14. By configuring the eyepiece optical system 15 such that a deflection original position of the scanner 14 is made conjugate with a pupil 16 of an observer, the scanned light beam 12 passes through at substantially one point of the pupil 16 of the observer, thereby drawing a desirable image on a retina 17. Thus, by two-dimensionally scanned with the light beam 12 by the scanner 14, a two-dimensional image is formed on the retina 17.

On the other hand, the scanning center of the scanner 14 makes an angle θ2, which is different from the angle θ1 in State 1, with the incident direction of the light beam 12 (hereinafter referred to as State 2) and is on a second optical axis 110 for scanning the back screen 18 which is the direct-view display element. In this case, the back screen 18 is scanned with the light beam 12 through the projection optical system 111 by the scanner 14. By using a transmission type diffusion plate having a light diffusion characteristic as the back screen 18, a two-dimensional image is formed on the back screen 18 scanned with the light beam 12 in the two dimensional directions by the scanner 14. Therefore, the observer 112 can observe the formed image.

A function for determining a region of the back screen 18 scanned by the scanner 14, a function correcting distortion caused by a positional relationship between the scanner 14 and the back screen 18, and the like can be provided for the projection optical system 111.

Figure 2:
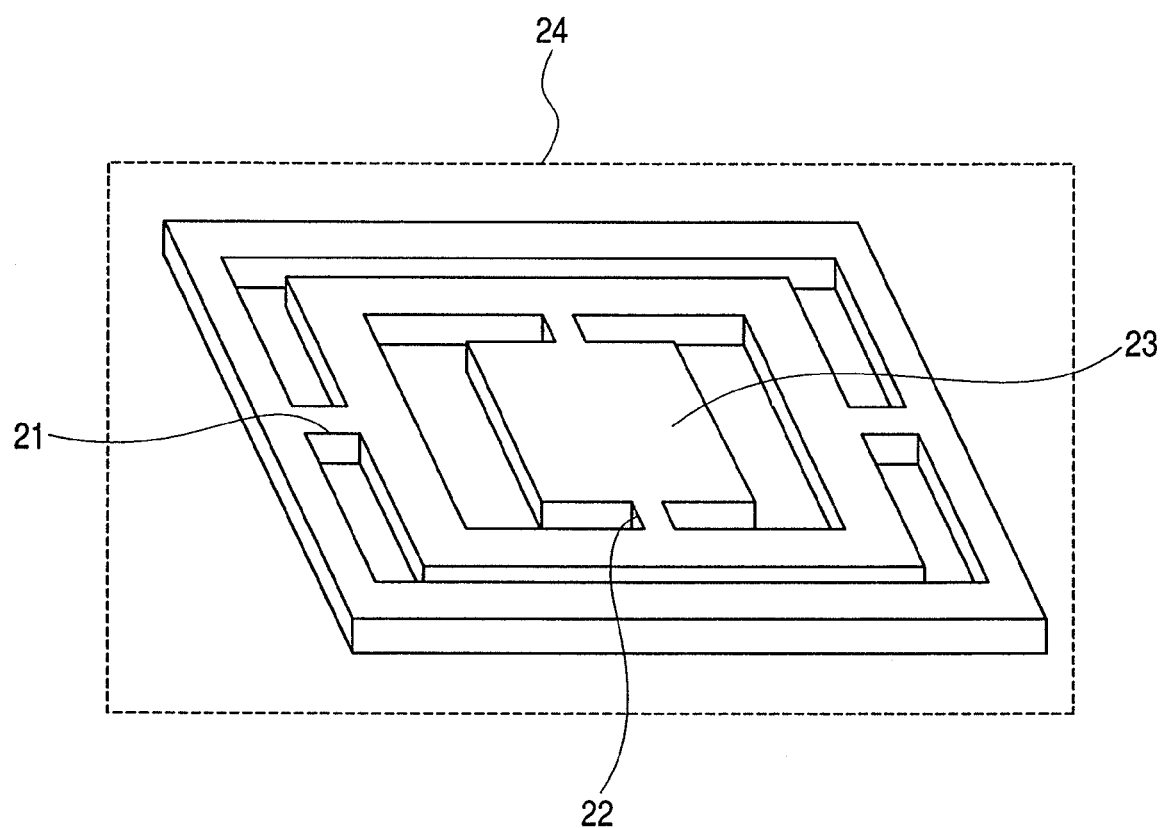
FIG. 2 shows an example of a two dimensional scanner using a deflection mirror device (MEMS scanner) for the scanning image display device.

In this embodiment, a deflection mirror device produced by a MEMS technique is used as an example of the scanner 14. FIG. 2 is a schematic view showing the deflection mirror device. A deflection mirror device 24 is a mirror having a scanning function, which is produced by processing a Si substrate using the MEMS technique. A mirror 23 that reflects an incident light is held by two torsion bars 21 and 22. The two torsion bars 21 and 22 are orthogonal to each other. A light beam which is incident on the scanner 14 is reflected on the mirror 23. At this time, each of the two torsion bars 21 and 22 is twisted about a reflection surface of the mirror 23 by external force. Therefore, it is possible to change the orientation of the reflection surface of the mirror 23, thereby scanning with the light beam incident on the mirror in the two-dimensional directions.

A mechanism for changing a stationary position of the scanner 14 will be described below as an example of a means for changing the object to be scanned of the scanner 14. The scanning center can be switched between State 1 and State 2 by, for example, changing the stationary position of the mirror of the deflection mirror device which is an example of the scanner 14.

Figure 3A:
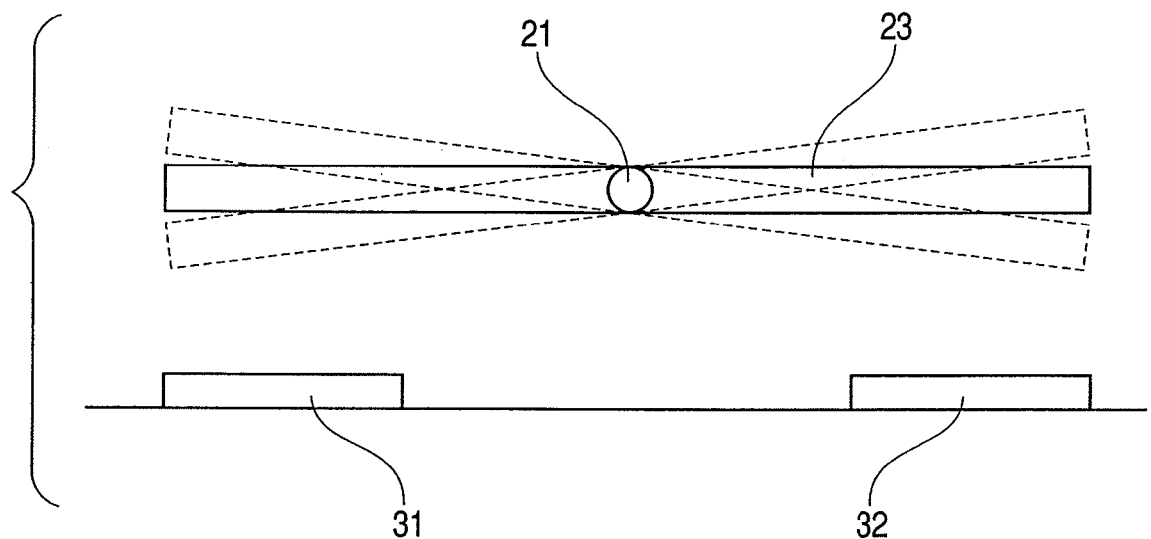
FIGS. 3A and 3B are explanatory views showing a switching means of a scanning center of the deflection mirror device in Embodiment 1.
Figure 3B:
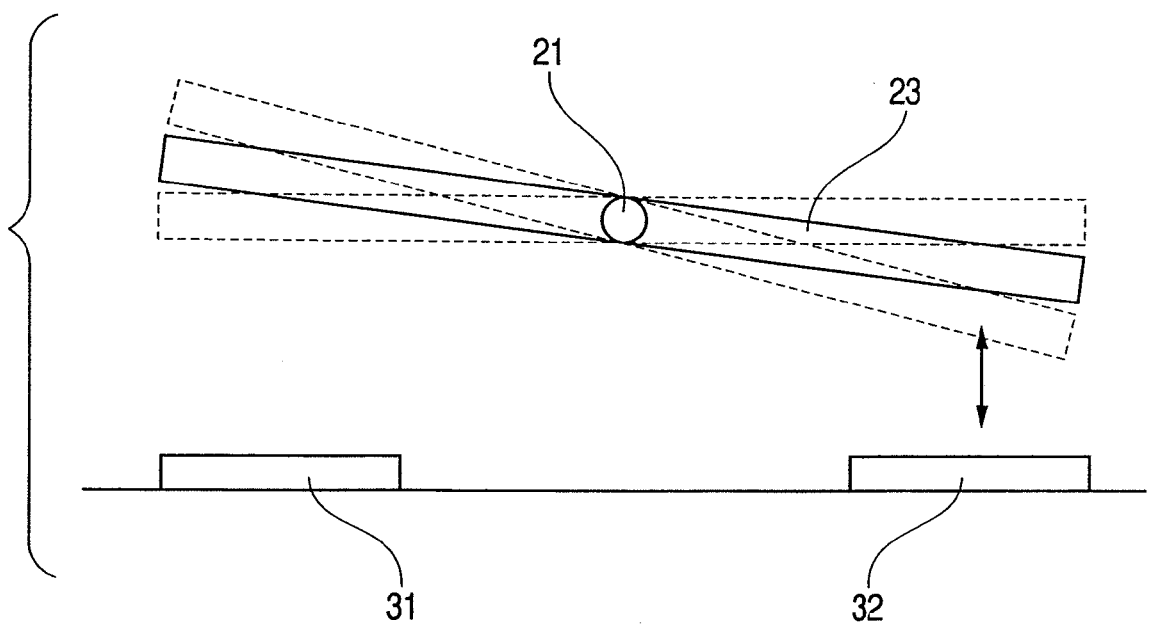

FIGS. 3A and 3B schematically show the occurrence of vibration motion in the rotating direction of the mirror of the deflection mirror device and an example of a switching means for switching the stationary position (scanning center). As shown in FIGS. 3A and 3B, electrodes 31 and 32 are disposed near the mirror 23 at opposite positions. Note that FIGS. 3A and 3B show the case where the mirror is observed from a direction parallel to the torsion bar 21. Similarly, even in the case where the mirror is observed from a direction parallel to the torsion bar 22, electrodes 33 and 34 are disposed. A different voltage is applied to each of the electrodes 31 and 32 to generate electrostatic forces each having a different strength between the mirror 23 and the electrodes 31 and 32. Therefore, the mirror 23 can be rotated about the torsion bar 21. In this time, an electric potential of the mirror 23 is kept constant.

FIG. 3A shows a state of the deflection mirror device 24 in State 1. The mirror 23 vibrates about a horizontal state as an origin in the rotating direction.

In the state shown in FIG. 3A, respective voltages applied to the electrodes 31 and 32 are expressed by the following expressions.

$$V31 = -A(t) \qquad \text{Electrode 31}$$

$$V32 = A(t) \qquad \text{Electrode 32}$$

When the voltages whose amplitudes are equal to each other and polarities are opposed to each other are applied to the electrodes, the mirror 23 is rotated about the torsion bar 21 to perform scanning with the incident light beam. Here, t denotes a time and A(t) denotes an applied voltage component periodically varied with the time t.

In contrast to the state shown in FIG. 3A, FIG. 3B shows a state of the deflection mirror device 24 in State 2. The mirror 23 vibrates about a position shifted from a horizontal state as an origin in the rotating direction. For example, when a bias voltage is applied to only the electrode 32, electrostatic force is generated on only one side of the mirror 23 as shown in FIG. 3B, thereby vibrating the mirror 23 about a tilt state thereof as an origin. Therefore, the state shown in FIG. 3B can be realized.

In the state shown in FIG. 3B, respective voltages applied to the electrodes 31 and 32 are expressed by the following expressions.

$$V31 = -A(t) \qquad \text{Electrode 31}$$

$$V32 = A(t) + V1 \qquad \text{Electrode 32}$$

According to the above-mentioned voltage application, as shown in FIG. 3B, the mirror 23 vibrates about a state in which the mirror 23 is tilted as the scanning center. Therefore, it is possible to scan the object to be scanned different from that in State 1 with the incident light beam. Here, V1 denotes a bias voltage applied to only the electrode 32. Not only in the case where the bias voltage is applied to one of the electrodes but also in the case where a voltage having a different amplitude is applied to each of the electrodes, the scanning center can be adjusted.

Only the motion about the torsion bar 21 is described. The motion about the torsion bar 22 is similarly produced.

FIG. 4 is a schematic graph showing scanning characteristics of the scanner 14. FIG. 4 shows, of the scanning characteristics of the scanner 14, in particular, a scanning characteristic in a vertical direction in the case where a scanning direction used for switching the scanning center corresponds to a vertical direction of a reproduced image.

A line 41 is an example of a scanning characteristic of the scanner 14 in a vertical scanning direction. In FIG. 4, the ordinate indicates swing angle and the abscissa indicates time. It is possible that the scanner 14 has, as the scanning characteristic in the vertical scanning direction, a saw-tooth scanning characteristic including a linear region as indicated by the line 41. Scanning in the horizontal direction corresponding to a position at each swing angle is performed in a part that slopes upward to the right, of each of regions drawn by the line 41 in FIG. 4 as described below.

In this time, the scanner 14 can has scanning amplitude 46 in the vertical direction, however, in practice, a single object to be scanned is not necessarily scanned with the scanning amplitude indicated by 46. A range with the scanning amplitude 46 can be divided into two regions, that is, a region 47 and 48 having a scanning center 45 and 43, respectively, different from the scanning center 45 to perform scanning having a small scanning amplitude 44 and 42, respectively. For example, the region 47 is assigned to an optical path toward the eyepiece optical system 15 in FIG. 1 and the region 48 is assigned to an optical path toward the direct-view display element 18 in FIG. 1. Therefore, it is possible to switch between two display modes. According to the above-mentioned mechanism, for example, in order to reproduce SVGA (800 in width and 600 in height) images on both screens of the view finder and the direct-view display element, which are disposed vertically adjacent to each other, by scanning using the scanner 14 through the optical path toward the eyepiece optical system 15 and the optical path toward the direct-view display element 18, the scanner 14 requires the scanning amplitude 46 of at least 1200 lines corresponding to two times of 600 lines. When the image is displayed on the view finder, a signal is inputted from the controller 113 to the scanner 14 such that the mirror of the scanner 14 vibrates only with 600 lines corresponding to the region (amplitude) 47, of the scanning amplitude 46 of 1200 lines, thereby performing scanning. Scanning is not performed on the other region. When the image is displayed on the direct-view display element, a predetermined bias is added to the signal from the controller 113 such that the mirror vibrates only with 600 lines corresponding to the region (amplitude) 48. Thus, the image can be reproduced on the plurality of screens in the signal scanning display device.

Figure 6A:
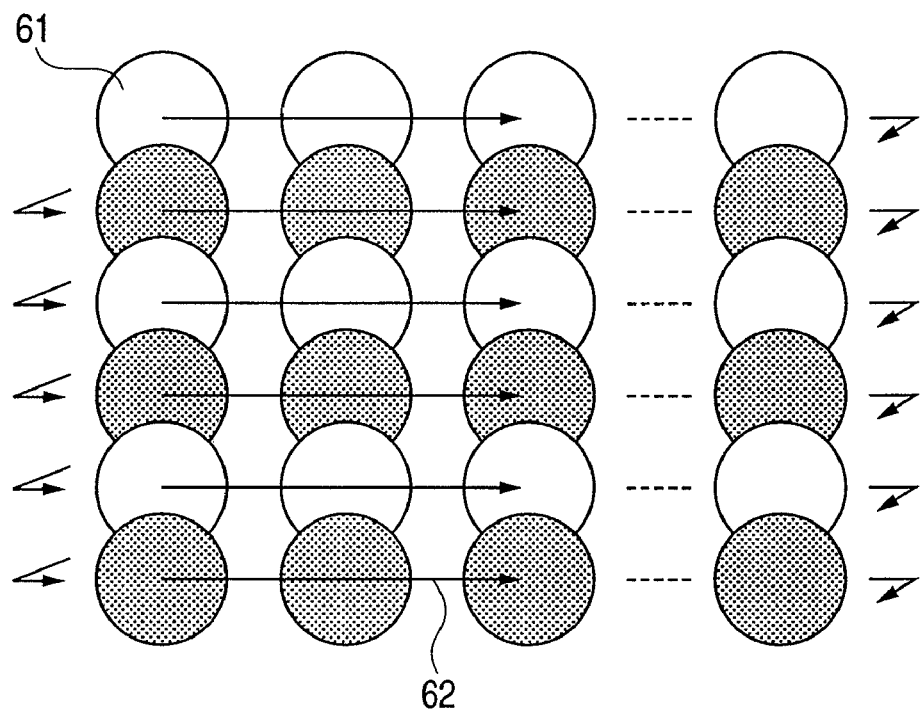
FIGS. 6A and 6B are explanatory views showing a scanning method using the scanner in the scanning image display device.
Figure 6B:
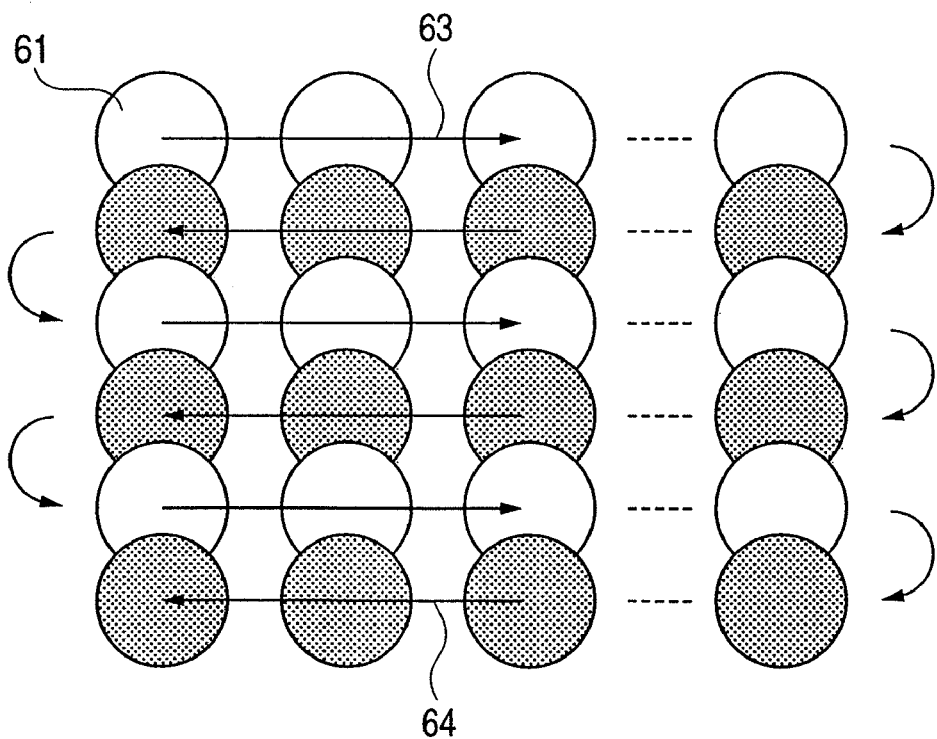

FIGS. 6A and 6B show a scanning method of performing scanning with the light beam 12 using the scanner 14. In the scanning image display device according to this embodiment, an image is produced by scanning with a single beam in the longitudinal and lateral directions by the scanner 14. Specifically, scanning is performed on a line in the horizontal direction and then scanning is performed on a line located below the line by one line. Such scanning is repeated to scan the entire screen. With respect to the horizontal scanning direction in this case, as shown in FIG. 6B, it is effective for drawing to reverse the scanning direction every line in view of a drawing speed. This case is compared with the case where scanning is performed by a scanning method corresponding to a type of an image generally produced by an image pickup device or the like as shown in FIG. 6A. As a result, it should be noted that image signals on a line (64) drawing hatched pixels, corresponding to a return route are treated as image data in a reverse direction to a line direction (63) of data produced by the image pickup device.

Figure 5:
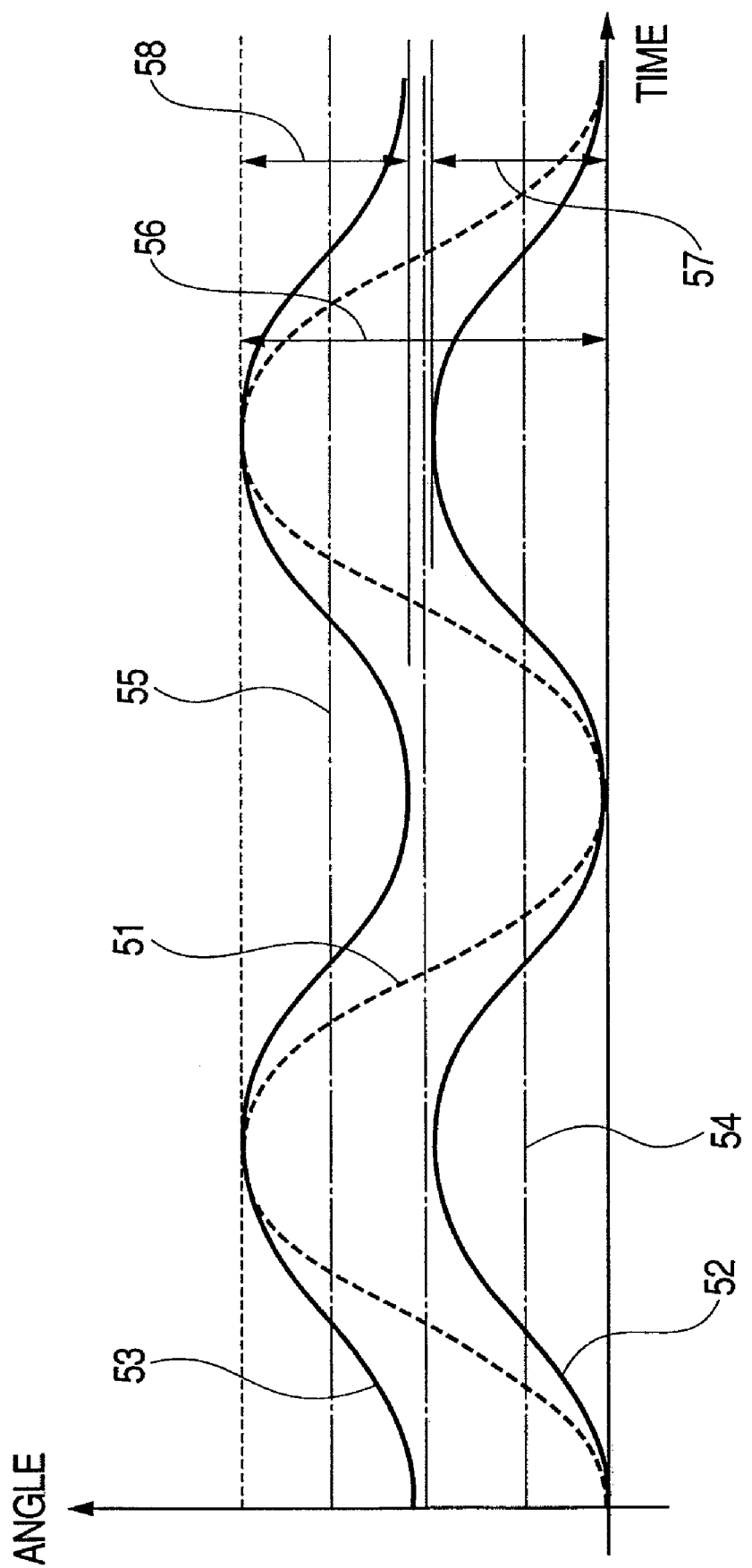
FIG. 5 is another example of an explanatory graph showing the scanning amplitude of the deflection mirror device in Embodiment 1.

In this embodiment, the scanning characteristic in the vertical scanning direction, which is used for switching of the display means, is set to the saw-tooth drive characteristic including the linear region. The scanning characteristic may be set to a sinusoidal drive characteristic as shown in FIG. 5. In this case, the scanner has a scanning characteristic indicated by reference numeral 51 and scanning amplitude indicated by reference numeral 56. In the case of State 1, drawing can be performed by vertical direction scanning having a scanning characteristic 52, a scanning center 54, and scanning amplitude 57. In the case of State 2, drawing can be performed by vertical direction scanning having a scanning characteristic 53, a scanning center 55, and scanning amplitude 58.

Figure 7:
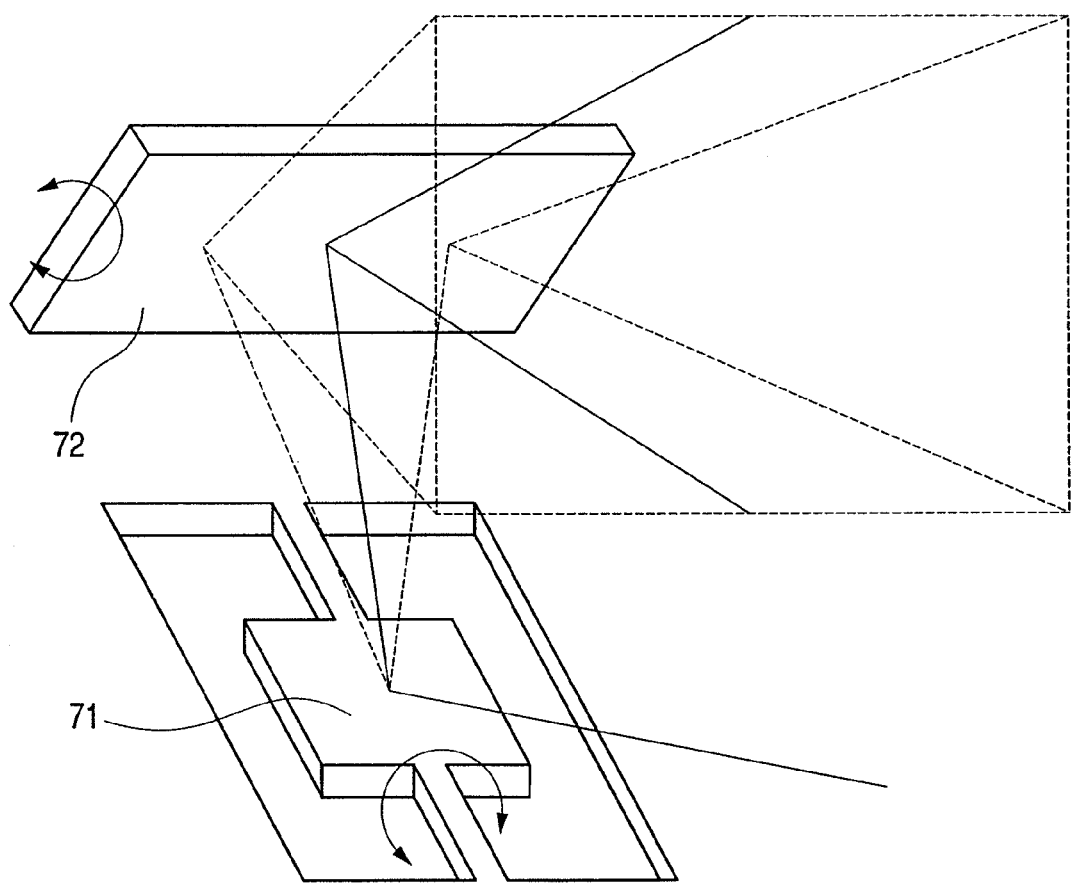
FIG. 7 shows an example of the two dimensional scanner used for the scanning image display device.

In this embodiment, the example using the two-dimensional deflection mirror device capable of performing scanning in the two-dimensional directions by itself as the scanner is described. Even when a two-dimensional scanning unit 73 in which a deflection mirror device 71 capable of performing scanning only in a one-dimensional direction is combined with a scanning mirror 72 for performing vertical direction scanning is used as shown in FIG. 7, the same effect can be obtained.

Embodiment 2

Figure 8:
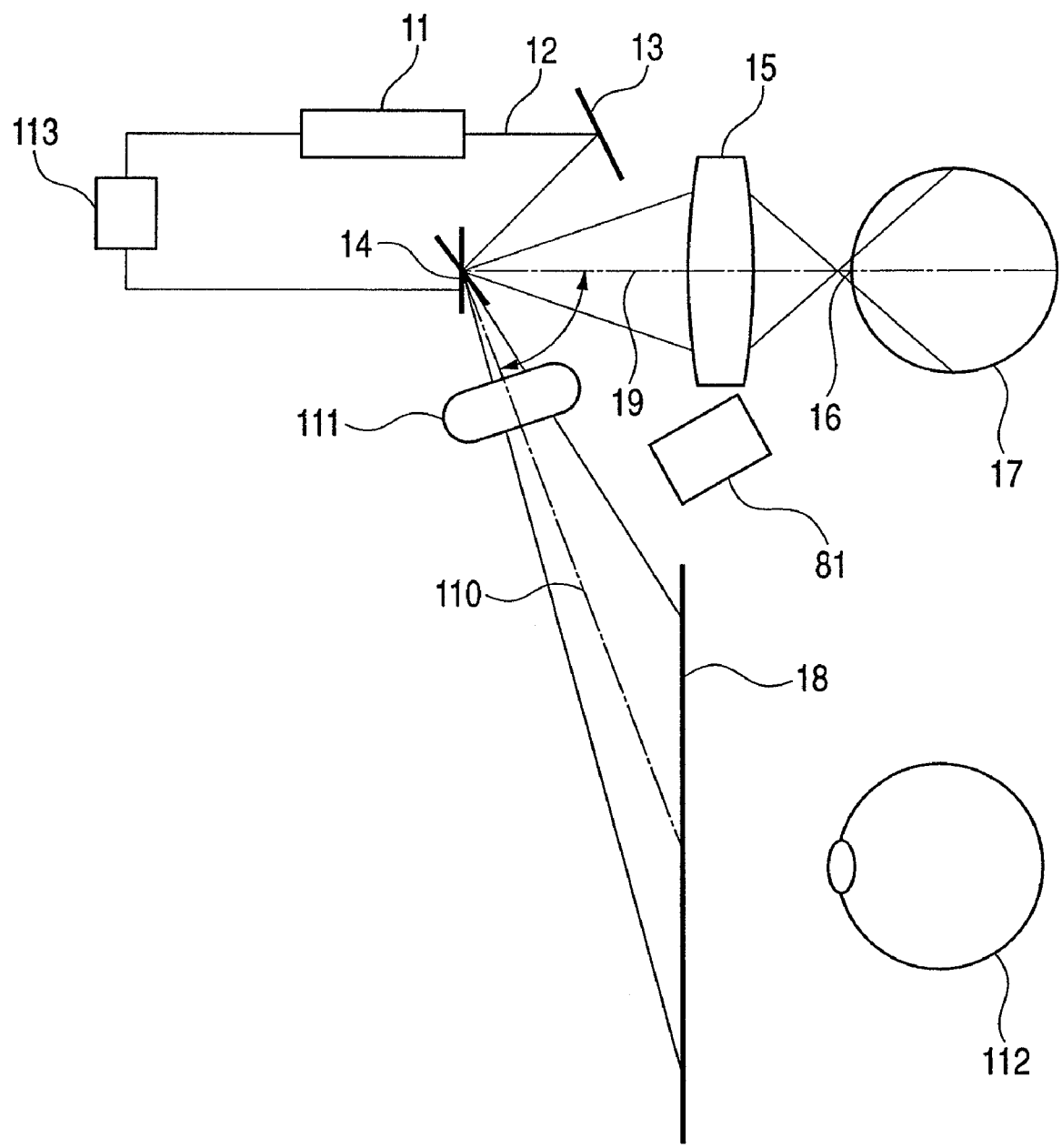
FIG. 8 is a schematic structural diagram showing a scanning image display device according to Embodiment 2 of the present invention.

FIG. 8 is an explanatory diagram showing a scanning image display device according to Embodiment 2 of the present invention. The scanning image display device according to Embodiment 2 has substantially the same structure as in Embodiment 1. However, a switching means for the display means serving as the objects to be scanned by the scanner 14 in Embodiment 2 is different from that in Embodiment 1. Hereinafter, assume that members for which the same reference numerals as those used in Embodiment 1 are provided have the same functions. Therefore, the detail descriptions related to the members are omitted here.

Figure 9:
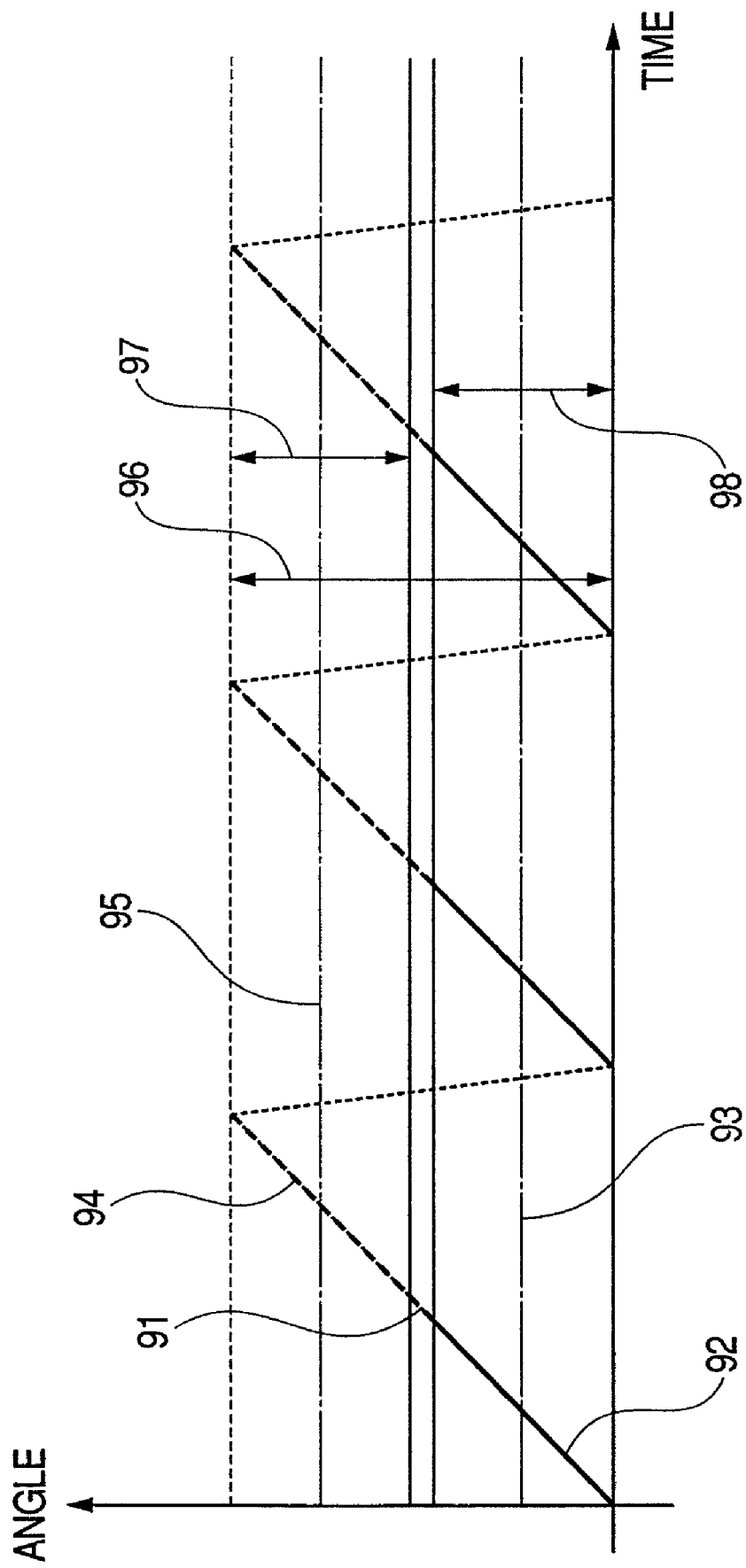
FIG. 9 is an example of an explanatory graph showing scanning amplitude of a deflection mirror device in Embodiment 2.

FIG. 9 shows, of the scanning characteristics of the scanner 14 in. Embodiment 2, in particular, a scanning characteristic in the vertical direction. In Embodiment 1, in order to switch the display means, the object to be scanned by the scanner 14 is changed by changing the rotation and vibration range of the mirror 23 included in the scanner 14. In contrast to this, in Embodiment 2, as shown in FIG. 9, the scanner always performs reciprocation in a range 96 corresponding to the entire area which can be scanned in the vertical scanning direction.

An optical path 97 for the viewfinder and an optical path 98 for the direct-view display element are arranged adjacent to each other in the longitudinal direction within the range 96 subjected to the reciprocation. Therefore, simultaneous display can be performed on both screens in the range (optical path) 97 corresponding to the near eye viewfinder and the range (optical path) 98 corresponding to the direct-view display element.

For example, when the resolution of the view finder and a back panel each is a resolution of SVGA (800×600), the scanner 14 having the scanning amplitude equal to or larger than 1200 lines is prepared. Here, it is possible that an image having 800 pixels×600 lines is displayed on the view finder by 600 lines corresponding to the range 97 and simultaneously the image having 800 pixels×600 lines is displayed on the direct-view display element by 600 lines corresponding to the range 98.

On the other hand, when either one of the displays is performed, the light beam 12 is emitted from the light source 11 to only an area corresponding to a specified display portion. Therefore, it is possible to prevent drawing in an area other than the area corresponding to the specified display portion. Even in this case, the lens of the scanner 14 vibrates with the entire scanning amplitude corresponding to the range 96, so that the control becomes easier.

Switching between the display on the viewfinder and the display on the direct-view display element may be automatically performed using a sensor 81 provided below the finder system. The sensor 81 is composed of a light source for emitting infrared light and a detector for detecting reflection infrared light. When an observer looks through the viewfinder, the infrared light from the light source is reflected on the face of the observer and the reflected light is detected by the detector. When the reflected light is detected, it is determined that the observer looks through the viewfinder. Therefore, an image is displayed on the electronic finder side. When the reflected light is not detected, it is determined that the observer does not look through the viewfinder. Therefore, the display mode is automatically switched to the direct-view display element side. Of course, the display mode may be manually switched.

As described above, according to the structure in this embodiment, it is possible to simultaneously display the image on two display means, that is, the viewfinder and the direct-view display element or display the image on either one of the two display means. However, in practice, the possibility that both the viewfinder system and the back panel are simultaneously observed is low. In addition, the simultaneous display causes an increase in electric power consumption. Therefore, it is desirable to display the image on either one of the two display means. For example, when the direct-view display element is intended to use while the viewfinder is used, it is desirable to perform display switching to eliminate the display on the viewfinder. Of course, the image may be simultaneously outputted to the two display means.

Embodiment 3

Embodiment 3 will be described with reference to FIG. 10. In Embodiment 3, a manner of switching between two display methods by rotating the entire scanner 14 about the mirror deflection original point of the scanner will be described as a modified example of Embodiment 1. According to the mechanism, even when the scanner 14 having a small swing angle is used, scanning can be performed by switching between a plurality of objects to be scanned which are separated from one another in view of an angle. A structure other than a display method switching means is identical to that in Embodiment 1 and therefore the detail description related to the structure other than the switching means is omitted here.

Figure 10:
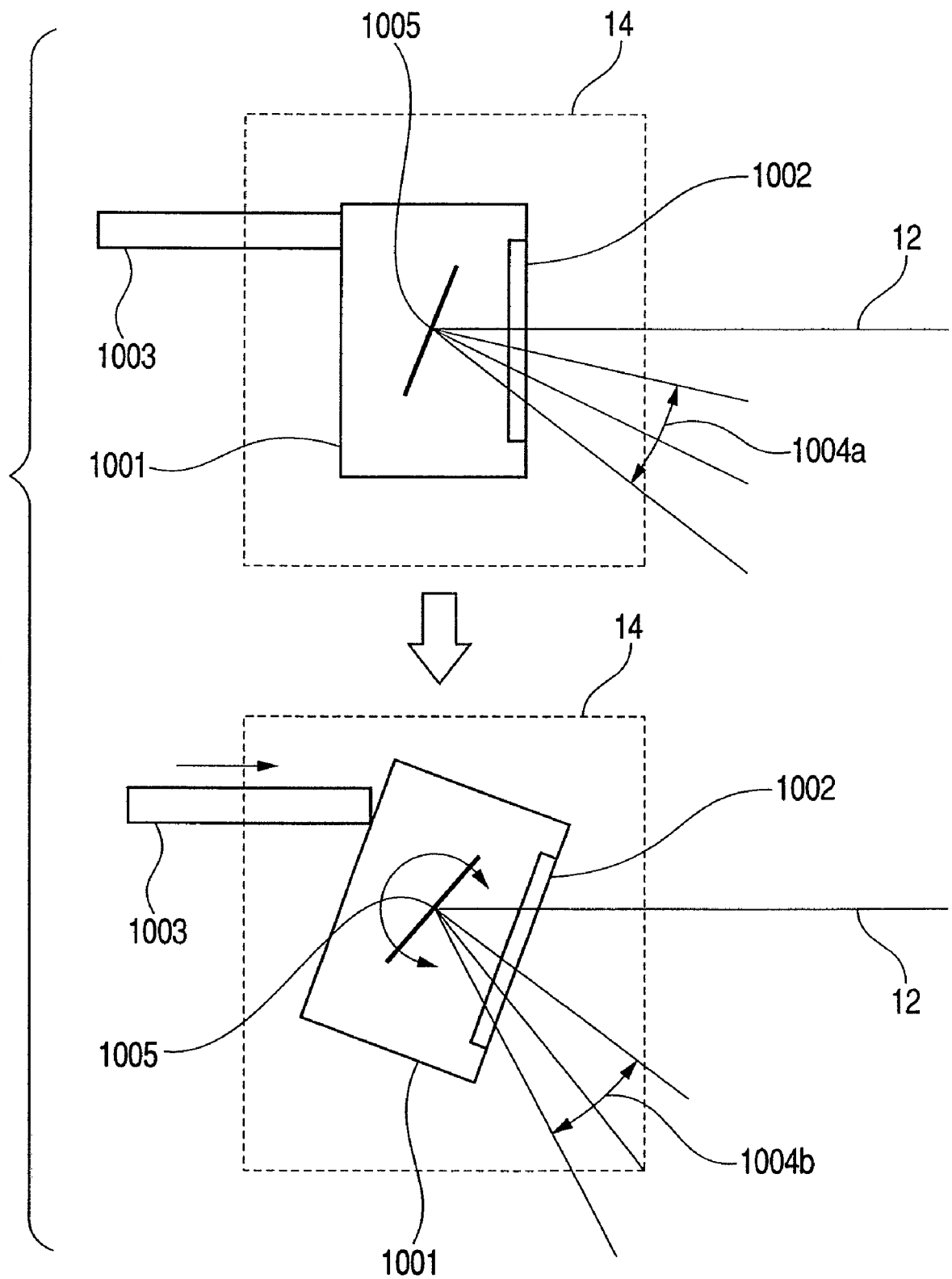
FIG. 10 is an explanatory view showing a scanning center switching means used for a scanning image display device according to Embodiment 3 of the present invention.

FIG. 10 is an explanatory view showing a mechanism for changing the object to be scanned by the scanner 14 in this embodiment. As shown in FIG. 10, the scanner 14 can be mechanically rotated about a rotating center 1005 of the deflection mirror 23 in the vertical scanning direction as an axis, that is, in a direction parallel to paper. According to the rotation of the scanner, the incident angle of the light beam 12 on the deflection mirror can be changed to switch the scanning range from a range 1004a to a range 1004b.

Figure 11:
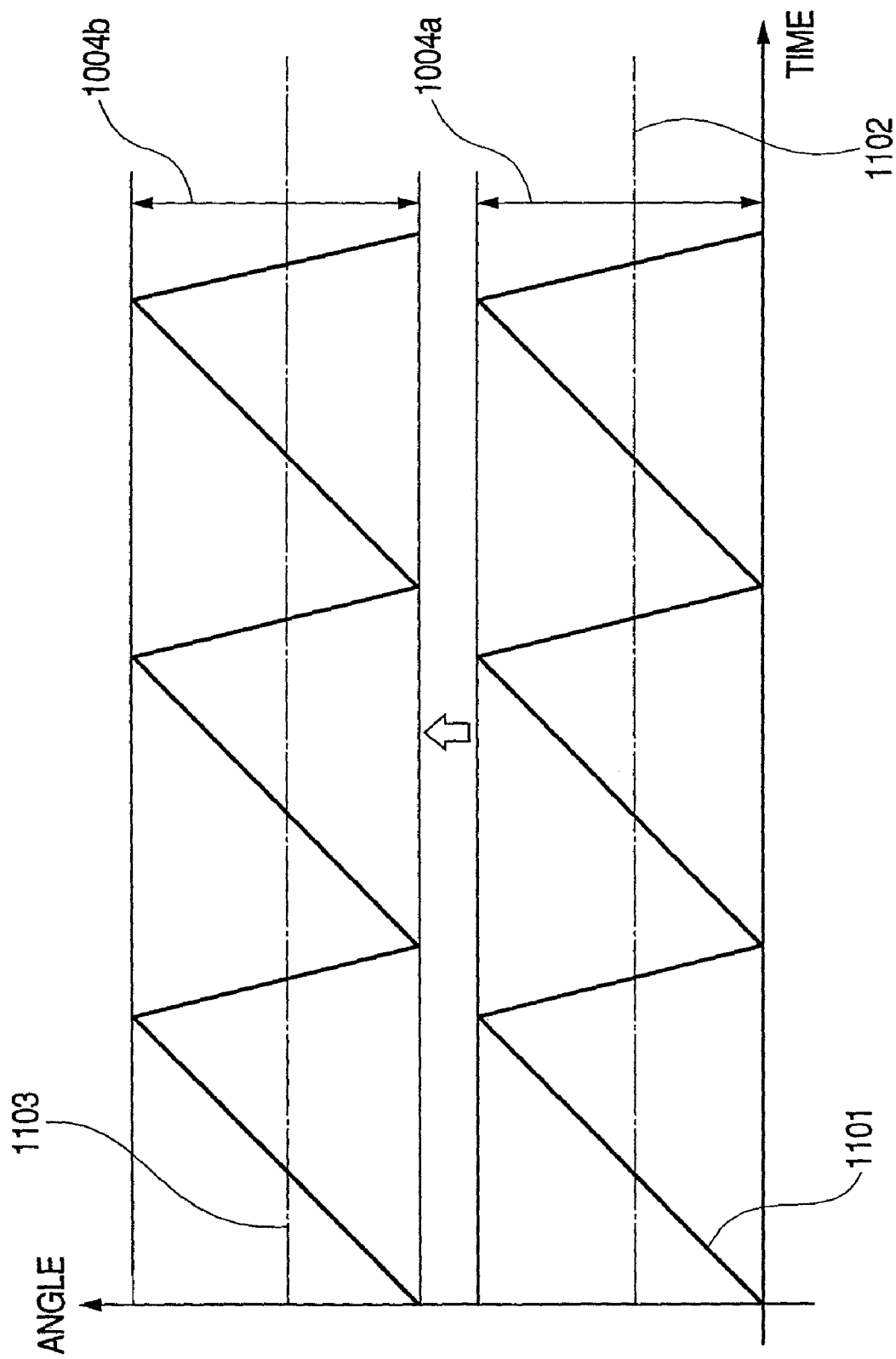
FIG. 11 is an explanatory graph related to a scanning amplitude of a deflection mirror device in Embodiment 3.

FIG. 11 is a graph showing a scanning characteristic in the vertical scanning direction in this embodiment. Scanning in the vertical scanning direction has a saw-tooth scanning characteristic including a linear region as indicated by reference numeral 1101. In State 1 in Embodiment 1, scanning is performed in a range 1004a with a scanning center 1102. When the display method is switched (to State 2 in Embodiment 1), the scanning center is shifted from an initial center 1102 to a position 1103, thereby performing scanning in a range 1004b. Therefore, by rotating the entire scanner to shift the scanning center in each of States 1 and 2, the display means can be switched.

Embodiment 4

Figure 12:
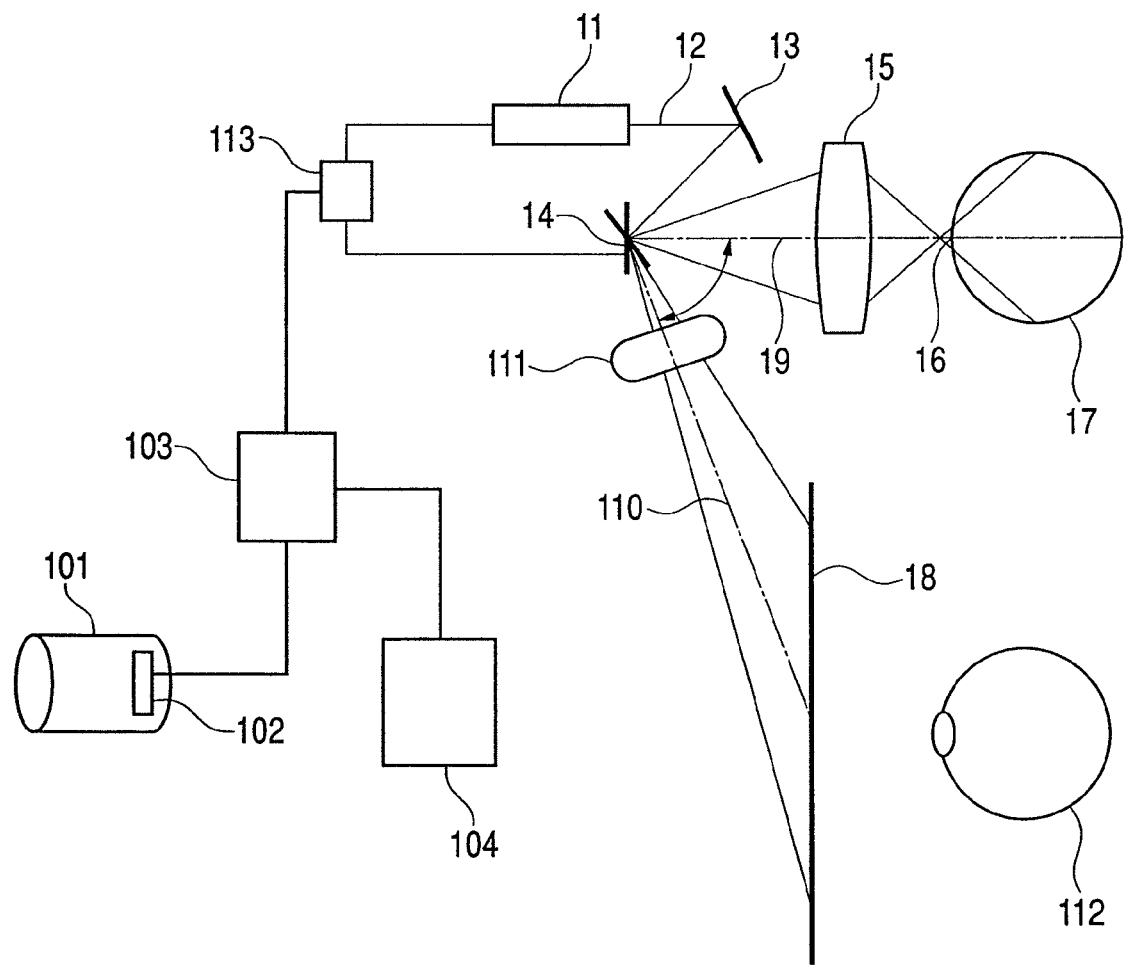
FIG. 12 is a schematic structural diagram showing an image taking apparatus according to Embodiment 4 of the present invention.

In Embodiment 4, a video image taking apparatus using the scanning image display device described above will be described. FIG. 12 is a schematic diagram showing the video image taking apparatus according to the present invention.

In FIG. 12, an image pickup optical system 101 forms images of a light beam from the outside on an image pickup element (photoelectric transducer) 102. The image pickup element 102 converts the incident light beam into an electric signal and outputs the signal to a signal processing means 103. The signal processing means 103 converts the input signal in a format suitable for a memory means 104 and a format suitable for the controller 113 of the scanning image display device. Then, the converted signals are outputted to the memory means 104 and the controller 113. That is, the controller 113 and the signal processing means 103 are electrically connected with each other, thereby electrically connecting the controller 113 with the image pickup element 102. Note that "the electrical connection" indicates that a state in which an electrical signal can be communicated between both regardless of wired connection or wireless connection.

According to the mechanism as described above, the controller 113 makes at least one of the view finder and the direct-view display element to display an image taken by the video image taking apparatus. Therefore, the image can be provided for the observer and the contents of the image can be checked. The memory means 104 records image by storing the signal from the signal processing means 103 in a magnetic tape or a memory composed of a semiconductor device.

As described above, in the scanning image display device for scanning with a light beam in the two-dimensional directions to display an image, it is possible to display the image on a plurality of locations by the signal scanner by providing a plurality of objects to be scanned by the scanner. When the scanning image display device is applied to the video image taking apparatus, for example, displaying on the viewfinder display and displaying on the direct-view display element located on the rear surface can be realized by single scanner. When switching between the two kinds of display methods is performed by the single device, it becomes possible to simplify a system structure.

This application claims priority from Japanese Patent Application No. 2003-342959 filed on Oct. 1, 2003, which is hereby incorporated by reference herein.

What is claimed is:

1. An image display device, comprising:
    a light source;
    a scanner which two-dimensionally scans with light received from the light source and is capable of directing light received from the light source to a first optical system situated downstream from the scanner and prior to a first image output, and to a second optical system which is independent from the first optical system and also situated downstream from the scanner and prior to a second image output; and
    a controller which controls the light source and the scanner and is electrically connected with the light source and the scanner,
    wherein the image display device is configured to conduct the light received from the light source to either the first optical system or the second optical system at a time.

2. An image display device according to claim 1, wherein the scanner directs the light emitted from the light source to one of the first and second optical systems.

3. An image display device according to claim 1, wherein the scanner comprises a mirror capable of two-dimensionally scanning with the light from the light source.

4. An image display device according to claim 1, wherein the scanner comprises a first mirror capable of one-dimensionally scanning with the light from the light source and a second mirror capable of scanning with the light from the light source in a direction orthogonal to a scanning direction of the first mirror.

5. An image taking apparatus, comprising:
    an image taking optical system;
    a photoelectric transducer for receiving an image formed by the image taking optical system and converting the image into an electrical signal; and
    the image display device according to claim 1,
    wherein the photoelectric transducer is electrically connected with the controller and the controller controls the light source and the scanner based on the electrical signal from the photoelectric transducer to form an image on the surfaces to be scanned.

* * * * *